UNITED STATES PATENT OFFICE.

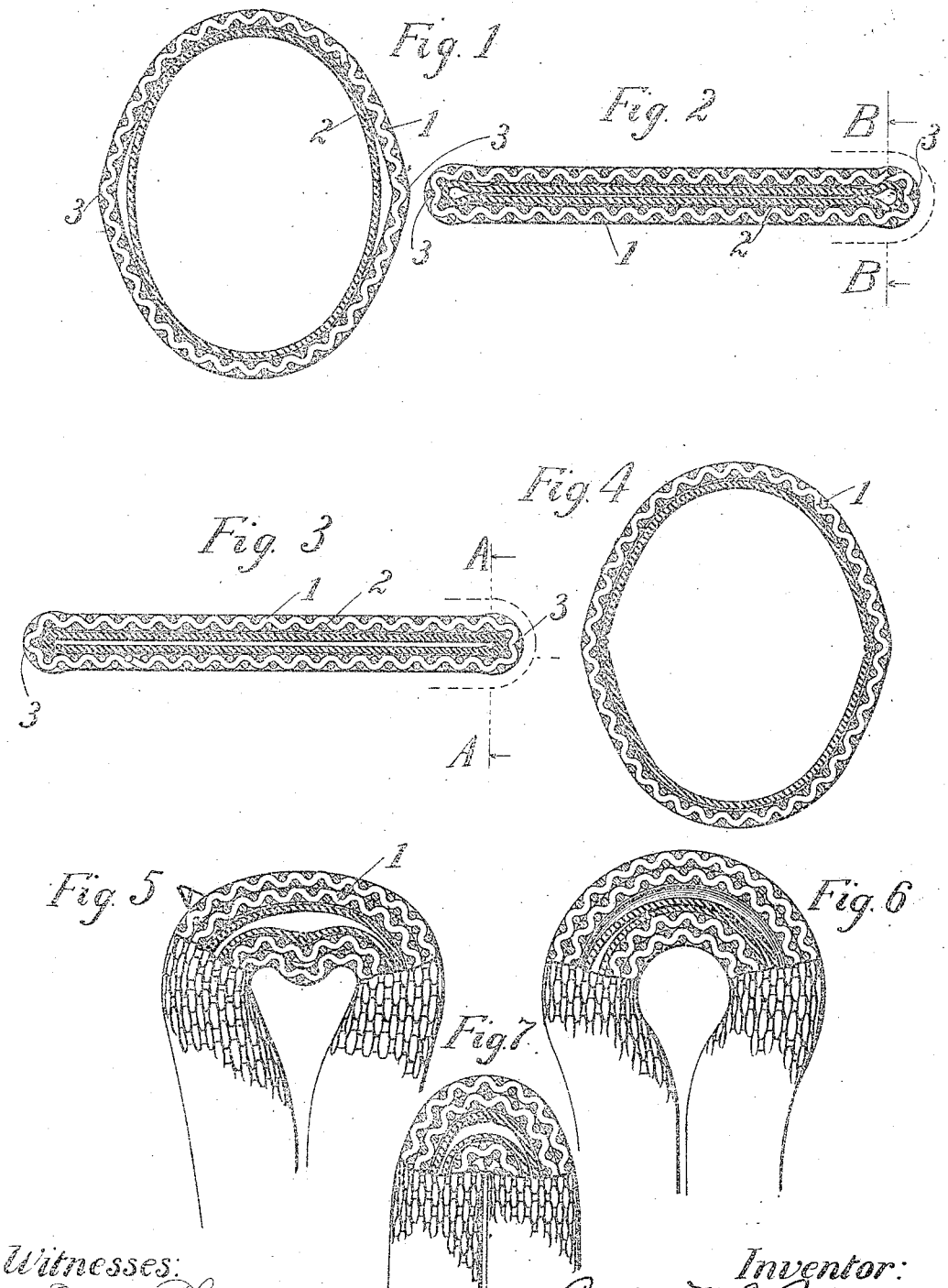

CASSIUS M. CLAY BAIRD, OF EVANSTON, ILLINOIS.

HOSE CONSTRUCTION.

935,086.  Specification of Letters Patent.  Patented Sept. 28, 1909.

Application filed August 31, 1908. Serial No. 450,988.

*To all whom it may concern:*

Be it known that I, CASSIUS M. CLAY BAIRD, a citizen of the United States of America, and a resident of Evanston, county of Cook, State of Illinois, have invented certain new and useful Improvements in Hose Constructions, of which the following is a specification.

The main objects of this invention are to provide an improved construction for fire and mill hose of the larger sizes which are usually flat when empty, and to provide an improved method of securing the rubber lining in hose of this kind whereby pinching of the lining along the creases of the hose, when flattened, is to a large extent prevented, and the life of the hose accordingly greatly increased.

A further object is to reduce the expense of manufacturing such hose by reducing the quantity of cement which is needed for securing the lining to the casing.

These objects are accomplished by the device shown in the accompanying drawings, in which—

Figure 1 is a transverse section of a fire hose constructed according to this invention. Fig. 2 is a corresponding section showing the hose flattened out as when it is stored on a rack or a reel. Fig. 3 is a similar section of a fire hose of the usual construction, showing the wrinkling of the lining which takes place along the creases of the casing when flattened. Fig. 4 is a section (corresponding to Fig. 1) of a fire hose of the usual construction. Fig. 5 is a side elevation illustrating the pinching and straining of the lining of a double-jacketed fire hose of usual construction at the point where the hose is bent upon itself, as when piled upon a rack, the sectional part being in the plane corresponding to the line A—A in Fig. 3. Fig. 6 is a similar view illustrating the folding of a double-jacketed hose wherein the lining is free from the casing adjacent to the longitudinal creases, as in this invention, the sectional part being in the plane of the line B—B of Fig. 2. Fig. 7 is a similar view of the ordinary double-jacketed hose illustrating another way in which the ordinary double-jacketed hose sometimes bends.

In the form shown in Figs. 1, 2, and 6, the hose is provided with a flexible casing 1 which may be of any usual construction and of any suitable material, being illustrated as being formed of woven cotton. The interior of the casing is provided with a tubular lining 2 of rubber. The casing is creased longitudinally at 3 along opposite sides, so that it normally assumes the flat form shown in Fig. 2 when it is empty and stacked upon a rack or wound upon a reel. The lining 2 is free from the casing along the creases 3 and for a considerable distance each side of each crease, and the remaining portions are firmly cemented to the casing 1. By this arrangement the lining may bend along the crease independently of the casing when the casing is flattened out as in Fig. 2.

Fig. 3 shows the usual construction wherein the rubber lining is cemented around its entire periphery to the casing. This view illustrates the pinching and distortion of the lining which takes place along the creases of the casing. Rubber, as is well known, gradually loses its resiliency, particularly if it is subjected to continued strain, and as the hose is in its flattened position most of the time, the rubber lining gradually takes a permanent form corresponding with that shown in Fig. 3, and then when the hose is filled with water under pressure the strain soon causes the rubber lining to split along the wrinkles adjacent to the creases of the casing, as illustrated in Fig. 4. This soon leads to breaks which extend entirely through the lining. As soon as the lining becomes torn along the creases, the hose leaks and is comparatively useless. The life of the hose, therefore, depends upon the life of that part of the lining which lies adjacent to the creases of the casing.

When the lining is free from the casing adjacent to the creases, as in Figs. 1 and 2, instead of being compressed circumferentially and wrinkling as in Fig. 3, it takes an easy curve and assumes the position shown in Fig. 2. With this construction, the life of the part of the lining which extends along the creases is substantially the same as that of the intermediate parts, and the life of the hose is therefore increased many fold. This construction also leads to a large reduction in the cost of manufacture of the hose, since the value of the cement for attaching the lining to the casing is usually a large item in the cost of the hose. Sufficient cement must be supplied to fill all of the irregularities in the woven casing so that the lining will lie smoothly against the same.

When the construction is as in Figs. 1 and 2, practically one-fourth of the lining of the hose is unattached to the casing, and a saving of that percentage of the cement results. In hose which has a double casing, commonly called double-jacket hose, much damage to the lining is caused by the bending of the hose upon itself at intervals of its length when it is stacked in racks. The effect of this transverse bending is most serious in the vicinity of the longitudinal creases. In this case, besides the wrinkling along the longitudinal creases, as illustrated in Fig. 3, there is also transverse wrinkling as in Figs. 5 and 7. These two figures represent two ways in which the double-jacket hose ordinarily bends when folded upon itself. Under the conditions illustrated in Fig. 5, the hose takes a double bend, and the inner part of the lining is compressed and puckered, while under the conditions illustrated in Fig. 7 the inner side of the casing makes a sharp bend, but the outer side of the lining becomes compressed and puckered under the pressure of the outer side of the casing. When the lining is free from the casing along the crease, as in the herein described invention, the double-jacket hose takes a graceful bend, such as is shown in Fig. 6, as the lining is free to adapt itself to the space in which it is confined without being compressed and puckered, as in the case of the usual form of hose. Adjacent to the couplings the lining is cemented to the casing around its entire periphery, as there is no flattening or sharp creasing of the casing at this point. By such construction all chance of water entering between the casing and the free parts of the lining is prevented.

The cement usually consists of rubber, and it therefore thickens the lining at the places where it is attached, and the attached parts of the lining stiffen the adjacent parts of the casing. The casing therefore bends more readily at places where the lining is thinner and unattached. In bending it takes a circular curvature, and the lining follows this curvature without influencing the bending of the casing or being strained and distorted thereby.

What I claim as my invention and desire to secure by Letters Patent is:—

1. A hose, comprising a flexible tubular casing creased to assume a flattened form when empty, and a flexible tubular lining secured to said casing at places between the creases, but free from the casing along and adjacent to the creases.

2. A hose, comprising a tubular casing creased along opposite sides to assume a flattened form when empty, and a tubular lining of rubber cemented to the casing between the creases, but free from the casing along and adjacent to the creases.

3. A hose, comprising a tubular casing adapted to be flattened when empty and a tubular lining of rubber cemented to the inner surface of the casing, but being free from the casing at opposite sides thereof throughout substantially the entire length of the hose.

4. A hose, comprising a tubular casing creased along opposite sides to assume a flattened form when empty, and a tubular lining of rubber cemented to the casing between the creases, but free from the casing along and adjacent to the creases, the attached portions of the lining being parallel and of uniform width throughout substantially the entire length of the hose.

5. A hose, comprising a casing and a rubber lining therefor, the lining being cemented to the casing at certain parts and uncemented at certain other predetermined parts, the uncemented areas being of a transverse width that is less than the periphery of the lining and extending substantially throughout the length of the casing.

6. A hose, comprising a flexible tubular casing creased to cause it to fold most readily along certain lines when empty, and a rubber lining cemented to the casing between the creases and unattached along and adjacent to the creases.

Signed at Chicago this 28 day of August 1908.

CASSIUS M. CLAY BAIRD.

Witnesses:
MARY M. DILLMAN,
EUGENE A. RUMMLER.